United States Patent [19]

Slemmons

[11] 3,731,387
[45] May 8, 1973

[54] STOCK MARKET CHARTING APPARATUS

[76] Inventor: John W. Slemmons, 19142 Glen Albyn, Orange, Calif. 92667

[22] Filed: Sept. 9, 1969

[21] Appl. No.: 856,359

[52] U.S. Cl. ................................................. 33/76 R
[51] Int. Cl. ................................................. B43l 7/00
[58] Field of Search ...................... 33/75, 76, 80, 103, 33/95, 1

[56] References Cited

UNITED STATES PATENTS

| | | | |
|---|---|---|---|
| 1,906,371 | 5/1933 | Dreifuss | 33/76 X |
| 2,226,906 | 12/1940 | Henderson et al. | 33/80 |
| 2,489,165 | 11/1949 | Smith | 33/76 X |
| 2,614,360 | 10/1952 | Hite | 33/76 X |
| 3,133,354 | 5/1964 | Irwin | 33/108 X |
| 3,284,903 | 11/1960 | Flack | 33/1 C |

*Primary Examiner*—Harry N. Haroian
*Attorney*—Hinderstein and Silber

[57] ABSTRACT

Apparatus for plotting stock market data. Included is a rectangular rule having along the edges of a central rectangular opening a plurality of scales of different incremental spacing. A charting sheet is positioned with an edge against a chart guide and with a selected point on the abcissa aligned with an index mark on the chart guide. When the rule is placed against a rule guide, a scale edge of the rule is lined up with the selected point, thereby facilitating easy entry of prices, volume or other data. In one embodiment the chart and rule guides are mounted on a notebook cover; in another embodiment the guides are combined in a unitary member adapted to engage an edge of the charting sheet.

15 Claims, 8 Drawing Figures

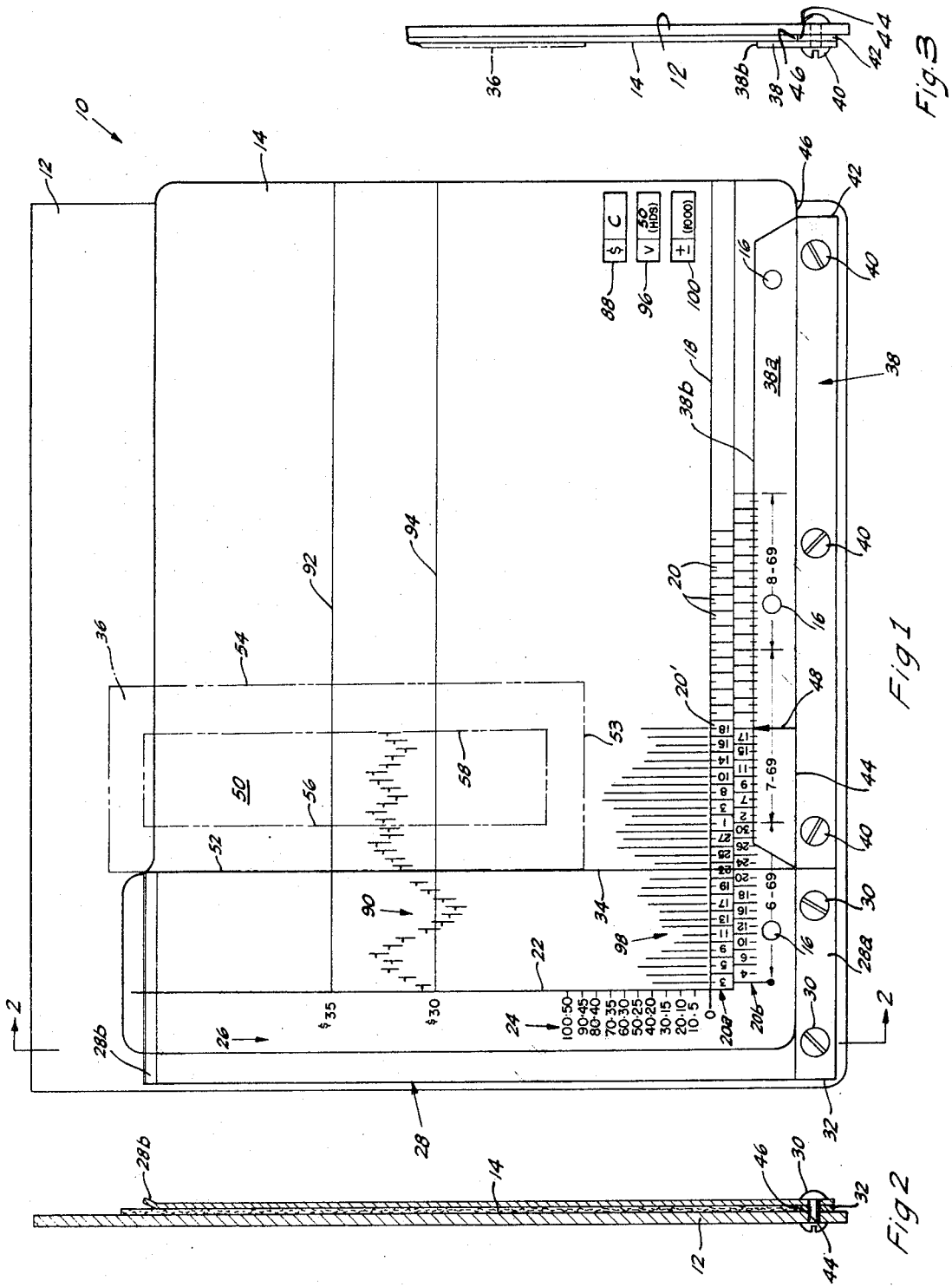

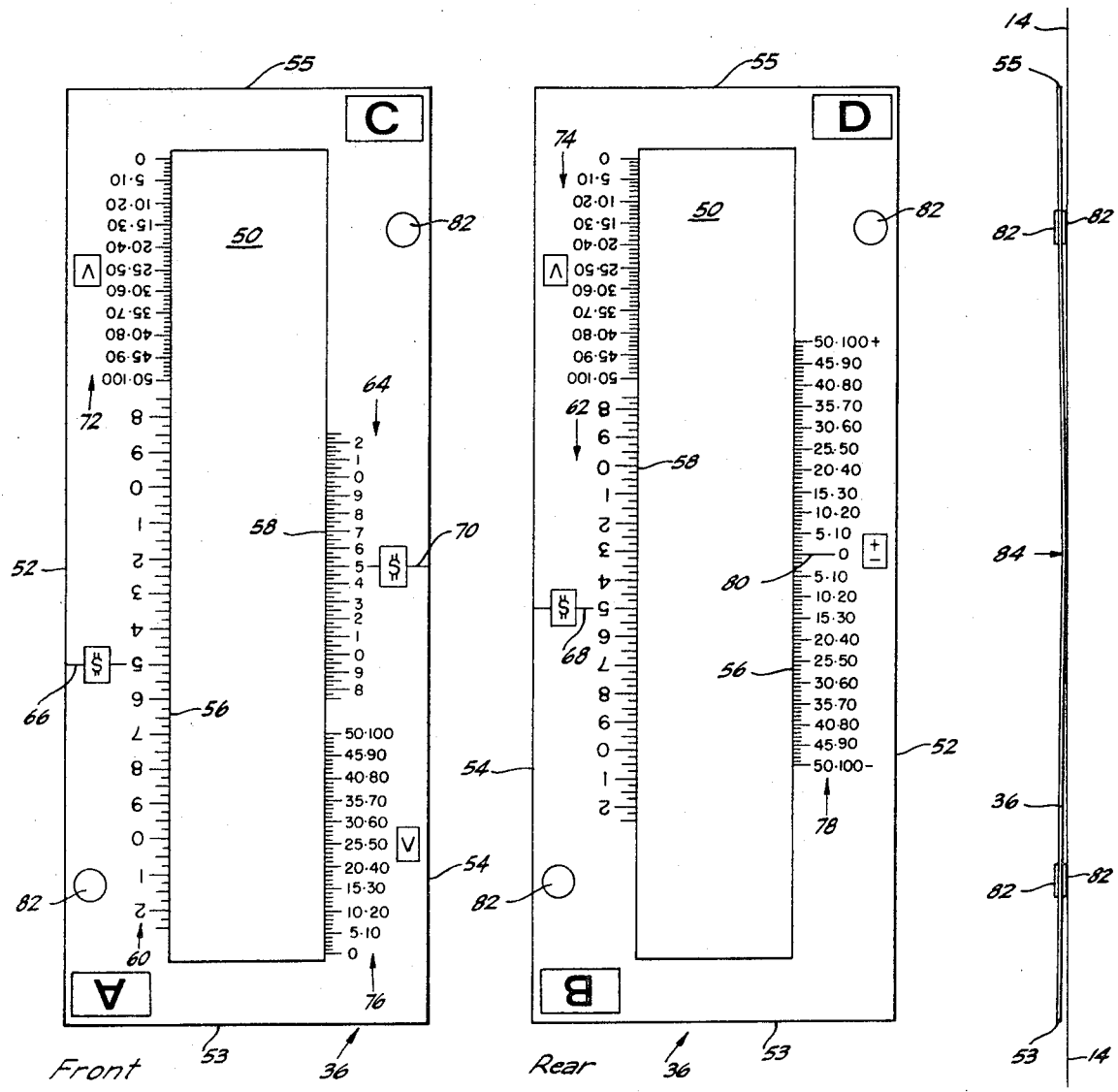

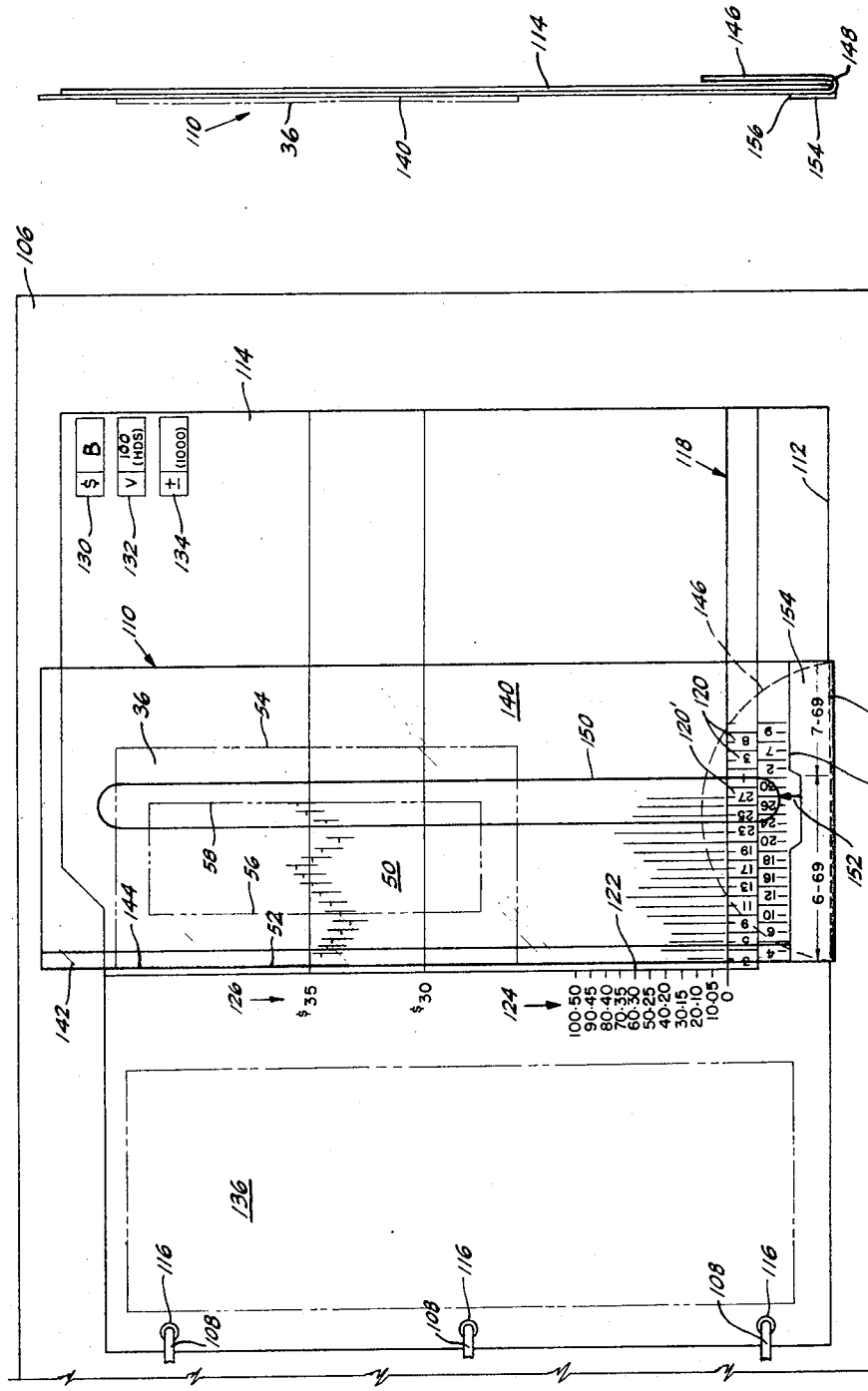

STOCK MARKET CHARTING APPARATUS

BACKGROUND OF THE INVENTION

1. Field of the Invention

The present invention relates to an apparatus for plotting data on a charting sheet. More particularly, the invention relates to an apparatus including a rule, a rule guide and a chart guide which facilitate the preparation of charts displaying stock market data.

2. Description of the Prior Art

An increasing number of stock market investors find it of interest to chart various market statistics which indicate the day to day performance of a particular stock. In fact, some investors decide whether to buy or sell a particular stock depending on the occurrence of certain price, volume or other indicator chart features. The updating of such charts is time consuming, particularly when a number of stocks are being followed on a daily basis. Moreover, such charts must be accurate and cannot be haphazardly prepared, since small indicator fluctuations often are sufficient to motivate large purchases or sales of a particular stock.

In the past, preparation of stock market charts has been a tedious process usually carried out with a straight edge and a sheet of graph paper. Typically, such graph paper has a linear abcissa scale wherein five equally spaced divisions represent the five days of the week on which the securities market is open. Along the ordinant is a linear price scale divided into groups of eight divisions representing dollars and eighths of dollars.

To enter price information on such graph paper, the investor must note the high, low and closing prices of the stock for the day, find the corresponding points along the ordinant of the graph, follow these points horizontally across the graph until reaching the vertical position representing the present date, and then use a straight edge to prepare a vertical line from the low to the high price, which line is crossed with a short horizontal mark at the closing price. Obviously, this routine is both tedious and likely to produce error.

Moreover, there is a tendency to use the same ordinant spacing to represent a price fluctuation of one dollar, regardless of whether this variation occurs in a stock priced at 10 dollars or several hundred dollars. Accordingly, for the low price stocks, the price fluctuations tend to be over-emphasized on the chart, whereas for high price stocks, price trends are hard to visualize.

Similar difficulties are experienced when making charts of other stock market indicators. Typical of such indicators are the "Volume-Price Trend" described by David L. Markstein in the book "How to Chart Your Way to Stock Market Profits", published in 1966 by Parker Publishing Company, and the "On-Balance Volume" indicator described by Joseph E. Granville in the book "Granville's New Key to Stock Market Profits" published in 1963 by Prentice-Hall, Inc. For these and other stock market indicators, price, volume and other stock data are combined to calculate a daily indicator value. Typically this value is a positive or negative amount possibly measured in incremental units related to the particular indicator. The problems associated with plotting such indicator data are similar to those discussed above, and no prior art apparatus is available for simplifying the charting of such data.

The present invention is directed toward providing an apparatus which permits the rapid, accurate plotting of stock market price, volume and other indicator information, in a form which permits optimum visual interpretation of the resultant chart.

SUMMARY OF THE INVENTION

In accordance with the present invention there is provided an apparatus for plotting stock market data and the like on a charting sheet. The apparatus comprises a substantially rectangular rule having adjacent elongate edges thereof, a plurality of price, volume and other scales of different incremental spacing. The apparatus also includes chart guide means which retains the abcissa of the charting sheet in perpendicular alignment with an edge of a rule guide. When a selected point along the abcissa is aligned with an index mark on the chart guide and an edge of the rule is placed against the rule guide, one or more of the scales will be in line with the selected abcissa point. Data then may be plotted using a rule edge both as a scale and as a guide for pencil or pen.

In a preferred embodiment, the rule includes a central rectangular opening parallel to the outer periphery of the rule. A plurality of price scales are provided adjacent edges of the opening, each price scale including approximately one decade of decimal price units. An identical volume scale is provided at one end of each rule edge containing a price scale. The rule also includes an indicator scale having plus and minus increments extending in opposite directions from a central zero index.

In one embodiment, the rule guide comprises a planar sheet of transparent plastic, one end of which is fixedly attached to a base, separated therefrom by a spacer. Typically, the base may comprise the cover a notebook. The chart guide comprises an elongate strip of transparent plastic fixedly attached to the base perpendicular to a straight edge of the rule guide, and separated from the base by another spacer. The index mark is located on the chart guide at a distance from the rule guide straight edge equal to one-half the width of the rectangular rule plus one-half of the width of the rectangular opening in the rule.

In another embodiment of the chart guide and rule guide are combined in a unitary member which also may be constructed of transparent plastic. The member includes a forwardly folded longitudinal edge which functions as the rule guide, and a rearwardly folded lip which functions as the chart guide. The unitary member also has an elongate opening the axis of which is parallel to the rule guide and aligned with the index mark on the chart guide.

To plot stock market data, the abcissa edge of the charting sheet is placed in contact with the chart guide, with the point on the abcissa for which data is to be entered aligned with the index mark. Typically, this point will be identified with a date for which stock market data is being charted. The rule is then placed on the charting sheet with the appropriate scale facing upward and with a peripheral elongate edge abutting against the straight edge of the rule guide. With the rule so oriented, the edge of the rule opening containing the desired scale will be aligned with the index mark, and hence will be lined up with the point on the abcissa for which data is to be charted. This scale edge then is used both as pencil guide and scale for entering data directly on the charting sheet. The newly entered data immediately may be compared with data for the preceding few days, which recent data may be seen through the rule opening even before the rule is removed from the charting sheet.

Another significant feature of the present invention is the use of a rule having price scales which include only the units decimal (i.e., dollar) digit. In a preferred embodiment, the scales include approximately 15 major divisions or graduations, consecutively numbered 8,9,0,1,2,3,4,5,6,7,8,9,0,1 and 2. Each of these graduations further may be divided into fractional parts, typically eighths. An index mark is provided through the numeral "5" at the center of the scale. The price scale of such a rule then may represent $35 ± 5, $115 ± 5, $10 ± 5, etc; that is, the scale is independent of the tens or hundreds digit value of the price.

The use of a rule having the configuration just described facilitates rapid, accurate plotting of stock price information. Thus, if the price is fluctuating about $35, the rule is placed on the charting sheet, perpendicular to the abcissa, with the $5 index mark aligned with the $35 horizontal line on the chart. The graduations on the rule then represent the values $28 through $42. Since only rarely does a stock price vary more than about $10 per day, this range is sufficient to plot most daily fluctuations. Moreover, by using a scale which extends approximately plus or minus $7, the necessity for moving the scale vertically when the price crosses a 10 dollar increment is eliminated. For example, if the daily price variations should be from a low of $38 to a high of $41, the rule would not have to be moved or positioned twice to plot the data.

This it is an object of the present invention to provide an apparatus for charting stock market data and the like.

Another object of the present invention is to provide a novel rule for use in plotting stock market data.

It is another object of the present invention to provide a data plotting apparatus including a scale having approximately 15 major graduations representing units digits only of the data to be plotted, and which is positioned on a charting sheet in units digit positional correspondance with an ordinant scale on the charting sheet.

It is another object of the present invention to provide an apparatus for plotting data on a charting sheet including chart guide means engaging an edge of the chart and rule guide means for maintaining a rule in position to chart data.

Still another object of the present invention is to provide a charting apparatus including a rule having a plurality of scales adjacent edges thereof, and guide means for maintaining a selected edge of the rule in alignment with an index mark pointing to the abcissa position for which data is to be entered.

It is yet another object of the present invention to provide a stock market charting apparatus including a rectangular rule having a plurality of price, volume and other scales adjacent edges of a central rectangular opening therein, and including means for maintaining the abcissa of a charting sheet perpendicular to scale edges of the rule, a selected scale edge being aligned with the position on the abcissa indicating the date for which stock market data is to be entered.

Yet another object of the present invention is to provide a stock market charting apparatus attached to the cover of a notebook.

A further object of the present invention is to provide a stock market charting apparatus including a rule and a unitary member adapted to engage a charting sheet and to serve as a guide for positioning the rule on the sheet.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 1 is a plan view of a first embodiment of the inventive apparatus for plotting stock market data on a charting sheet; in this embodiment a chart guide and a rule guide both are fixedly attached to a planar base which may comprise a notebook cover.

FIG. 2 is a sectional end view of the apparatus of FIG. 1 as seen generally along the line 2—2 thereof; the relationship between the rule guide, the base and the charting sheet is evident in this figure.

FIG. 3 is an end view of the apparatus of FIG. 1 showing the relationship between the chart guide, the charting sheet and the base.

FIGS. 4 and 5 respectively show front and rear views of a preferred embodiment of a rule which may be used with the stock market charting apparatus of FIGS. 1 or 7.

FIG. 6 is an edge view of the rule shown in FIGS. 5 and 6; the rule is shown disposed on a charting sheet and flexed to illustrate the function of raised feet provided on the rule.

FIG. 7 is a plan view of another embodiment of the inventive apparatus for charting stock market data; in this embodiment the rule guide and chart guide are combined in an unitary member.

FIG. 8 is an edge view of the chart and rule guide unitary member also illustrated in FIG. 7.

DESCRIPTION OF THE PREFERRED EMBODIMENTS

Referring now the the drawings and particularly to FIGS. 1—3 thereof, there is shown a first embodiment 10 of the inventive stock market charting apparatus. The components of apparatus 10 are attached to a planar, substantially rectangular base 12 which may comprise the cover of a conventional three-ring, looseleaf binder or other notebook.

Stock market or other data is plotted on a charting sheet 14 which may be printed on relatively thick paper of notebook size and having holes 16 which permit sheet 14 to be bound in a notebook for storage. Along the abcissa 18 of charting sheet 14 are a plurality of printed boxes 20 in which may be entered the date for which stock information is plotted. The boxes are arranged in staggered rows 20a and 20b to permit close spacing between data for successive days, while still allowing sufficient room within each box 20 to write the date.

Along the ordinant 22 of charting sheet 14 there is printed a pair of volume scales 24, the zero graduation of both scales coinciding with abcissa 18. One of the volume scales 24 is dimensioned in incremental units of five, the other in incremental units of ten. As described below, volume scales 24 may be used to plot the number of shares (in 100's) of a particular stock traded each day. The upper portion 26 of ordinant 22 is not pre-printed, but is used to enter stock price scale designations in increments of five dollars, as described in detail below.

Referring to FIGS. 1 and 2, charting apparatus 10 also is provided with a planar, substantially rectangular rule guide 28, preferably fabricated of transparent plastic. The lower end 28a of rule guide 28 is fixedly attached to base 12 by means of appropriate fasteners 30 such as the stud bolts illustrated. Fasteners 30 also extend through a spacer 32 having a thickness slightly greater than the thickness of charting sheet 14. The use of spacer 32 between rule guide 28 and base 12 allows charting sheet 14 to be positioned beneath rule guide 28 as illustrated. The upper end 28b of rule guide 28 is bent forward away from base 12 so as to facilitate insertion of charting sheet 14 behind rule guide 28. Rule guide 28 includes a straight edge 34 against which is positioned a rule 36 used to accomplish actual data plotting. The preferred configuration of rule 36 is described in conjunction with FIGS. 4 and 5 below.

As shown in FIGS. 1 and 3, apparatus 10 also is provided with a chart guide 38, preferably comprising an elongate strip of transparent plastic, attached to base 12 by means of fasteners 40. A spacer 42 preferably having the same thickness as spacer 32 is situated between chart guide 38 and base 12. Spacers 32 and 42 may be separate components, or may comprise a single elongate strip of plastic having an edge 44 perpendicular to straight edge 34.

The lower edge 46 of charting sheet 14 may be positioned against spacer edge 44, beneath a portion 38a of chart guide 38. Preferably, abcissa 18 is printed parallel to edge 46, so that as charting sheet 14 is moved along spacer edge 44, abcissa 18 remains perpendicular to straight edge 34 of rule guide 28.

Chart guide 38 is provided with an index mark 48 which is spaced an exact distance from straight edge 34. In particular, the perpendicular distance between straight edge 34 and index mark 48 is equal to the distance between the rule edge 52 or 54 positioned against straight edge 34 and the scale edge 58 or 56 along which data is plotted. When employing the preferred form of rule 36 illustrated in FIGS. 4 and 5, the perpendicular distance between straight edge 34 and index mark 48 is equal to half the width of rule 36 plus half the width of the rectangular interior opening 50 of rule 36. Thus when a selected box 20' (see FIG. 1) along abcissa 18 is aligned with index mark 48 and when rule edge 52 is positioned against straight edge 34, scale edge 58 will be lined up with index mark 48 in position for plotting data corresponding to the date entered in box 20'.

FIGS. 4, 5 and 6 respectively show front, rear and edge views of a preferred embodiment of rule 36. As evident in these figures, rule 36 is rectangular in shape and includes outer elongate edges 52 and 54 and ends 53 and 55. The central rectangular opening 50 of rule 36 includes elongate edges 56 and 58 which are parallel to edges 52 and 54. Opening 50 is located so that the distance between edges 52 and 56 is equal to the distance between edges 54 and 58. Thus the distance between edges 54 and 56 is equal to the distance between edges 52 and 58, and also equal to half the width of rule 36 plus half the width of opening 50.

In the preferred embodiment illustrated, rule 36 includes three price ($) scales 60, 62 and 64. Price scale 60 is on the front of rule 36 adjacent elongate edge 56 and is designated "$ scale A"; price scale 62 is on the rear of scale 36 adjacent elongate edge 58 and is designated "$ scale B"; and price scale 64 is on the front of rule 36 adjacent elongate edge 58 and is designated "$ scale C". Each of price scales 60, 62 and 64 includes approximately one decade of decimal price units, the scales being centered about the respective $5 index marks 66, 68 and 70. Note that a different incremental spacing is provided on each of price scales 60, 62 and 64. In the embodiment shown, the incremental spacing representing one dollar on scale 64 is approximately half the spacing representing one dollar in scale 60. Similarly, the incremental spacing representing one dollar on price scale 62 is approximately three-fourths the spacing representing 1 dollar on price scale 60.

Referring still to FIGS. 4 and 5, rule 36 also is provided with three identical volume scales 72, 74 and 76 each having a double set of graduations corresponding in value and spacing to volume scales 24 printed on charting sheet 14 (see FIG. 1). Volume scale 72 is on the front of scale 36 adjacent elongate edge 56; volume scale 74 is on the rear of rule 36 adjacent elongate edge 58; and volume scale 76 is on the front of rule 36 adjacent elongate edge 58.

The spacing between rule end 53 and the zero graduation of volume scale 76 is equal to the spacing between rule end 55 and the zero graduation of volumes 72 and 74; this spacing also is equal to the vertical distance between the upper edge 38b (FIG. 1) of chart guide 38 and abcissa 18, when edge 46 of charting sheet 14 abuts against spacer edge 44. This insures that when rule end 53 or 55 is positioned against chart guide edge 38b, the selected volume scale on rule 36 will be aligned vertically with printed scale 24 on charting sheet 14.

The rear of rule 36 (see FIG. 5) also is provided with a ± scale 78 adjacent elongate edge 56. This ± scale 78 includes two sets of graduations extending in opposite directions from a central zero index mark 80. As described below, the ± scale 78 is used for plotting various stock market indicators other than price and volume.

Note in FIG. 4 that the scales 64 and 76 adjacent rule edge 58 are upside down with respect to scales 60 and 72 adjacent rule edge 56. This configuration makes it unlikely that the incorrect scale will be used to plot data when rule 36 is placed front side up on charting sheet 14. Thus, when edge 52 is positioned against rule guide edge 34, elongate edge 58 will be aligned with index mark 48; accordingly, data should be entered from scales 76 or 64. Since these scales are right side up, the operator is unlikely to enter data erroneously from one of upside down scales 60 or 72. Similarly, on the rear of rule 36 (see FIG. 5) scales 62 and 74 adjacent rule edge 58 are upside down with respect to scale 78 adjacent rule edge 56.

To facilitate lifting rule 36 off the surface of a charting sheet, both the front and rear of rule 36 are provided with raised feet 82. Typically each of raised feet 82 comprises a small plastic button or boss extending about 1/32 inch from the surface of rule 36. The function of feet 82 is indicated by edge view of FIG. 6 wherein rule 36 is shown disposed on the surface of charting sheet 14. When a slight finger pressure is exerted against the upper surface of rule 36 adjacent the center thereof (as indicated by arrow 84), rule 36 flexes slightly so as to pivot about feet 82. This causes rule ends 53 and 55 to be elevated sufficiently above charting sheet 14 so as to enable a person to grasp ends 53 or 55 with his fingers. Thus rule 36 may be lifted from charting sheet 14 much more easily than if feet 82 were not provided.

Operation of the inventive stock market charting apparatus 10 may be understood in conjunction with FIGS. 1, 4 and 5. First, the charting sheet 14 associated with the particular stock being evaluated is placed on base 12, with edge 46 beneath chart guide portion 38a and against spacer edge 44. Charting sheet 14 then is moved horizontally along spacer edge 44 until the particular date block 20' for which data is to be entered is aligned with index mark 48. In the illustration of FIG. 1, this date is July 18, 1969 (i.e., 7-18-69). The numerical date "18" then may be written in block 20'.

Next, the appropriate scale of rule 36 is selected. In the example shown, the price has been plotted using scale 64, that is, using $ scale C. To remind the investor of this fact, charting sheet 14 includes a block 88, identified by a pre-printed dollar sign, in which block the designation C has been entered to identify the price scale used to prepare the chart.

As indicated by the price data 90 already plotted on charting sheet 14, the price of the selected stock has been fluctuating around $35.00. Accordingly, a horizontal line 92 has been drawn on charting sheet 14 and identified along the ordinant with the indication "$35"a. A second horizontal line 94 also has been drawn on charting sheet 14, spaced below line 92 by a distance equal to $5.00 as measured on price scale 64 ($ scale C); line 94 has been identified by the ordinant designation "$30".

Rule 36 is placed atop charting sheet 14, front side up, and with edge 52 abutting against straight edge 34 of rule guide 28. Rule 36 is moved vertically along edge 34 until the $5 index mark 70 of price scale C is aligned with line 92 on charting sheet 14. Next, price information for the specific stock being charted is obtained from a source such as the Wall Street Journal. In the example shown, for the date being plotted the stock price ranged between a low of $31.50 and a high of $33.00, closing at $32.50. To enter this data, a line is drawn using edge 58 as a guide, between the graduations representing 1.5 and 3.0 on price scale 64 (see FIG. 4). Since $5 index mark 70 was aligned with the $35.00 horizontal line 92, the resultant data line segment 96 will represent a price ranging from $31.50 to $33.00. Without moving rule 36, a short horizontal mark may be made opposite the graduation representing 2.5 on scale 64 to indicate the stock closing price of $32.50.

With the apparatus illustrated in FIG. 1, the stock price data 90 for the few days preceding the date for which information is plotted may be seen through opening 50 of scale 36. Thus, the price trend of the stock may be observed while the new price data is being plotted, and without removing scale 36 from charting sheet 14.

Selection of whether $ scale A, B or C is used to plot price data for a particular stock depends on the typical daily price fluctuation of that stock. For example, for a low cost stock, the price may fluctuate less than 1 dollar each day. Use of price scale 60 ($ scale A), which has the largest incremental spacing of the three price scales 60, 62 and 64, permits these small daily price variations to be readily visible on the chart. Conversely, for higher priced stocks which fluctuate by larger dollar amounts daily, price scales 62 or 64 ($ scales B or C) are used to produce the most easily intepretable graphs.

In the preferred embodiment shown in FIGS. 4 and 5, scales 60, 62 and 64 each extend approximately ± $7 from a central $5 graduation. This configuration permits stock price data to be entered without repositioning rule 36 even though the daily price variation may pass a 10 dollar mark. For example, with $5 index mark 70 aligned with $35 line 92 (FIG. 1), any price variation between about $28 and about $42 can be plotted without repositioning rule 36.

To plot volume information for the selected stock for the date aligned with index mark 48, rule 36 is moved along straight edge 34 of rule guide 28 until the bottom edge 53 of rule 36 abuts against the edge 38b of charting guide 38. As indicated earlier, the zero index mark of volume scale 76 will be aligned with abcissa 18, and each of the graduations of scale 76 will be in alignment with the corresponding graduation of volume scale 24 printed on charting sheet 14. Another printed block 96 is provided on sheet 14 in which may be entered a designation of which of the two volume scales (0–50 or 0–100) has been used to plot volume information for the selected stock. In the illustration of FIG. 1, previous volume information 98 has been plotted using the 0–50 scale, and the scale identification "50" has been written in block 96.

For the particular date (7-18-69), 2500 shares of the stock were traded. Accordingly, a line is made on charting sheet 14, using edge 58 as a guide, between the "0" and "25" scale graduations on the 0–50 volume scale 76. This new line indicates the present day's sale of 2500 shares, which sales immediately may be compared with the volume data 98 for the preceding days, which data also is visible through opening 50 of rule 36 before rule 36 is removed from the surface of charting sheet 14.

Although not illustrated, if charting sheet 14 had been used to plot an indicator such as "on-balance-volume", "volume price trend" or other data which fluctuates by a plus or minus change value daily, scale 78 (± scale D) of rule 36 (see FIG. 5) would have been used. Since scale 78 has two sets of graduations, a printed block 100 is provided on charting sheet 14 (see FIG. 1) to record which of the scales (± 0–50 or ± 0–100) was used. Further, the ordinant designations 26 would not be in dollars, as when plotting price information, but would be in numerical units related to the particular indicator.

To enter such indicator data, the rear of rule 36 is placed face up atop charting sheet 14, with edge 54 abutting against straight edge 34 of rule guide 28. Zero index mark 80 is horizontally aligned with the last data point (not shown) entered on charting sheet 14, and the new indicator value is entered using rule edge 56 as a guide. Use of ± scale 78 eliminates the need to add or subtract the present day's change in indicator value from the net value for the previous day. In particular, by aligning zero index mark 80 with the previous day's net indicator value, and entering the change directly from scale 78, the resultant mark on charting sheet 14 will be at the correct new indicator value. The previous days indicator activity immediately may be seen through opening 50, without removing rule 36 from charting sheet 14.

Although not illustrated, the stock market charting apparatus 10 of FIG. 1 may be used with a rule which does not have a central opening. Such a rule may be rectangular in shape and have front and rear scales similar to those illustrated in FIGS. 4 and 5, but with the scales provided along the outer edges of the rule. In this case, the perpendicular distance between rule guide straight edge 34 and index mark 48 (see FIG. 1) would be equal to the width of the non-apertured, rectangular rule.

Another embodiment of the inventive stock market charting apparatus is shown in FIGS. 7 and 8, in conjunction with a notebook 106 having binder rings 108. In this embodiment, the rule and chart guides are combined in a unitary member 110 which preferably is constructed of transparent plastic. As described below, member 110 is adapted to engage an edge 112 of a charting sheet 114, which sheet includes holes 116 adapted to be retained by notebook binder rings 108. Unitary member 110 is not attached to notebook 106, however as illustrated, the cover of notebook 106 may be used as a base or support for charting sheet 114 when data is being entered thereon.

Charting sheet 114 is similar to charting sheet 14 of FIG. 1, including an abcissa 118 provided with boxes 120 for the entry of dates, and an ordinant 122 provided with a pair of volume scales 124 and a region 26 for entering price or other ordinant scale information. Charting sheet 114 includes three printed blocks 130, 132 and 134, analogous to blocks 88, 96 and 100 of charting sheet 14, for the entry of $, V and ± scale information. Charting sheet 114 also is provided with a region 136 in which various data relating to the stock being plotted may be entered. For example, data region 136 may include a stock transaction history for entry of the dates on which various shares of the selected stock were traded by the investor. Similary, data region 136 may be used to record sales, earnings, dividends and other financial data related to the company whose stock history is being plotted.

Referring still to FIGS. 7 and 8, unitary member 110 itself includes a planar, substantially rectangular portion 140 having a width somewhat larger than the width of rule 36. An elongate edge portion 142 of member 110 is folded forward to form a lip which functions as a rule guide. Thus, the interior edge 144 of folded portion 142 functions analogously to straight edge 34 of rule guide 28 in the embodiment of FIG. 1. The bottom end of member 110 is folded backward to form a lip 146. In the embodiment illustrated, lip 146 is semi-circular, thereby facilitating insertion of the lip behind charting sheet 114.

Note that the interior bottom edge 148 of member 110 is perpendicular to edge 144, and engages the bottom edge 112 of charting sheet 114. This insures that straight edge 144 is perpendicular to abcissa 118, so that when an edge of rule 36 abuts against edge 144, data plotted using an elongate edge of rule 36 as a guide will be entered parallel to ordinant 122. In this regard, note that unitary member 110 is provided with an elongate central opening 150, the central axis of which is parallel to edge 144 and coincident with an index mark 152 provided on planar portion 140 of member 110. Data is entered on charting sheet 114 through opening 150.

Index mark 152 is analogous to index mark 48 in the embodiment of FIG. 1. That is, the perpendicular spacing between straight edge 144 and index mark 152 is identical to the spacing between straight edge 34 and index mark 48 (see FIG. 1). Thus, if unitary member 110 is designed for use with rule 36 (FIGS. 4 and 5), the perpendicular distance between straight edge 144 and index mark 152 is equal to one-half the width of rule 36 plus one-half the width of central opening 50 of rule 36.

It should be apparent that when rule 36 is placed atop planar member 140, with an elongate edge 52 or 54 abutting against straight edge 144, an interior elongate edge 56 or 58 will be aligned with index mark 152, so that data can be entered on charting sheet 114 using this interior edge 56 or 58 as a guide. Because of the spacing involved, the guide edge will be situated along the central axis of opening 150.

Unitary member 110 also is provided adjacent its lower end with a strip member 154 which functions as a rule stop. Rule stop 154 has an upper edge 156 which is parallel to edge 148 and situated so that when an end 53 or 55 or rule 36 abuts against edge 156, the zero index mark of one of the volume scales 72, 74 or 76 will coincide with abcissa 118. Thus, edge 156 of rule stop 154 functions analogously to edge 38b of charg guide 38 of the embodiment of FIG. 1.

Operation of the unitary charting apparatus 110 illustrated in FIGS. 7 and 8 is similar to that of the embodiment of FIG. 1. Initially, the lower edge of 112 of charting sheet 114 is inserted between planar member 140 and the rearwardly folded lip 146, with the sheet edge 112 abutting against interior edge 148 of member 110. Unitary member 110 then is moved horizontally with respect to charting sheet 114 until index mark 152 is aligned with the box 120' corresponding to the date for which stock market data is to be plotted. Since member 110 is moveable, charting sheet 114 may remain attached to notebook 106 by means of rings 108 as shown in FIG. 7.

Since price scale B has been used to plot the previous price data on sheet 114 (as indicated by the B written in block 130), rule 36 is placed atop planar member 140 with the rear side facing upward, and with elongate edge 52 abutting against straight edge 144. In this instance, the elongate interior edge 58 adjacent price scale B will be aligned along the axis of central opening 150 of member 110, in line with index mark 152. Elongate rule edge 58 then may be used as a guide for plotting price data on charting sheet 114. Note that the pencil or pen (not shown) used to enter the data will project through opening 150 to enable marking of sheet 114.

For entering volume information, rule 36 is positioned atop planar member 140 (FIG. 7) with an elongate edge 52 or 54 abutting against straight edge 144 and with end 53 or 55 abutting against edge 156 of rule stop 154. In this position the zero index of the selected volume scale 72, 74 or 76 will be aligned with abcissa 118, so that the graduations of the volume scales will coincide with the corresponding graduations of the volume scales 124 printed on charting sheet 114. Again, data is entered using edge 56 or 58 as a guide and with the marking pencil or pen extending through opening 150 in member 110.

Although not illustrated, the amount of space available for entry of data on charting sheet 14 or 114 may be increased by the use of an overlay chart or an overlapping chart extension. Such a extension may comprise a charting sheet the left-hand edge of which is not provided with an ordinant scale, but which overlaps, and is attached to the right-hand edge of sheet 14 or 114. Thus the chart extension increases the width of the sheet 14 or 114, permitting the stock price, volume or other indicator history to be plotted on a single extended chart covering a period of many months or years.

While the invention has been described with respect to several physical embodiments constructed in accordance therewith, it will be apparent to those skilled in the art that various modifications and improvements may be made without departing from the scope and spirit of the invention.

I claim:

1. Apparatus for plotting data on a charting sheet, comprising:
    a planar base,
    a substantially rectangular rule having a scale adjacent one elongate edge thereof,
    a substantially planar rule guide having a straight edge, said charting sheet being positionable beneath said rule guide, said rule guide comprising:
    first spacer means, and a generally rectuangular planar member, one elongate edge of said planar member comprising said straight edge, one end of said planar member being fixedly attached to said base and separated therefrom by said first spacer means,
    chart guide means cooperating with said rule guide for retaining the abscissa of said charting sheet in perpendicular alignment with said rule guide straight edge, said chart guide means having an index mark spaced from said straight edge by a distance equal to the spacing between said one elongate edge and another elongate edge of said rule, whereby when said other elongate edge of said rule is placed against said straight edge, said one elongate edge is perpendicular to said abscissa and aligned with said index mark, and wherein said chart guide means comprises:
    second spacer means, and
    a strip member including said index mark, said strip member being fixedly attached to said base and separated therefrom by said second spacer means whereby when an edge of said charting sheet is disposed beneath a portion of said strip member and against one of said spacer means, the abscissa of said charting sheet is aligned perpendicular to said straight edge.

2. Apparatus according to claim 1 wherein said rule includes a central rectangular opening, the elongate edges of said opening being parallel to and equally spaced from the respective exterior elongate edges of said rule, said rule further including a plurality of scales of different incremental spacing, said scales being adjacent the elongate edges of said opening.

3. Apparatus according to claim 2 wherein said index mark is spaced from said straight edge by a distance equal to half the width of said rule plus half the width of said opening.

4. Apparatus according to claim 1 wherein each of said first and second spacer means has a thickness slightly greater than the thickness of said charting sheet, and wherein said strip member is attached substantially perpendicular to said straight edge and in alignment with said one end of said planar member, whereby when said charting sheet is disposed beneath said strip member and against said second spacer means, said data sheet may be moved freely parallel to the abcissa, a portion of the charting sheet being disposable beneath said planar member.

5. Apparatus according to claim 4 wherein said planar member and said strip member each comprise transparent plastic, and wherein said base comprises the cover of a notebook.

6. Apparatus for plotting stock market data on a chart having an abscissa scale and an arbitrary ordinate scale, said apparatus comprising:
    a planar, substantially rectangular base,
    a rule guide attached to said base,
    chart guide means attached to said base for maintaining the abscissa of said chart perpendicular to a first edge of said rule guide, said chart being positionable parallel to said abscissa and beneath said rule guide,
    a rule having along one elongate edge at least one scale including major graduations identified by consecutive units digits and having a fiducial mark associated with a particular one of said graduations, said rule being positionable above said chart against said rule guide first edge with said one scale parallel to the chart ordinate and with said fiducial mark aligned with a point on said ordinate having the same units value as said particular one of said graduations, and
    wherein said chart guide means has an index mark spaced from said rule guide first edge by a distance equal to the spacing between said rule one edge and another elongate edge of said rule, whereby when said other elongate edge of said rule is placed against said rule guide first edge, said rule one edge is perpendicular to said abscissa and aligned with said index mark.

7. Apparatus as defined in claim 6 wherein said rule includes a plurality of scales of different incremental spacing, each scale being adjacent a different elongate edge of said rule.

8. Apparatus as defined in claim 7 wherein said rule includes a central rectangular opening, the elongate edges of said opening being parallel to the outer elongate edges of said rule, said scales being adjacent the elongate edges of said opening.

9. Apparatus as defined in claim 7 wherein scales are included on both front and rear surfaces of said rule.

10. Apparatus as defined in claim 7 wherein said rule is flexible, said rule including one or more thin raised feet projecting from the surface thereof and adapted to rest on said charting sheet, whereby pressure applied to the upper surface of said rule will cause said rule to pivot about said feet so as to facilitate lifting of said rule from said charting sheet.

11. apparatus according to claim 6 wherein said one scale has approximately fifteen major graduations, said fiducial mark being associated with the central one of said major graduations.

12. Apparatus according to claim 6 wherein said fiducial mark is associated with the units digit "5" major graduation, and wherein each of said major graduations is divided into fractional graduations.

13. Apparatus for plotting stock market data on a chart having an abscissa scale and an arbitrary ordinate scale, said apparatus comprising:
- a planar, substantially rectangular base,
- a rule guide attached to said base,
- chart guide means attached to said base for maintaining the abscissa of said chart perpendicular to a first edge of said rule guide, said chart being positionable parallel to said abscissa and beneath said rule guide, and
- a rule having along one edge at least one scale including major graduations identified by consecutive units digits and having a fiducial mark associated with a particular one of said graduations, said rule being positionable above said chart against said rule guide first edge with said one scale parallel to the chart ordinate and with said fiducial mark aligned with a point on said ordinate having the same units value as said particular one of said graduations.

14. Apparatus for plotting stock market data on a chart having abscissa and ordinate scales, said apparatus comprising:
- a planar, substantially rectangular base,
- a rule guide attached to said base,
- a rule having first and second elongate edges,
- chart guide means attached to said base for maintaining the abscissa of said chart perpendicular to a first edge of said rule guide, said chart being positionable parallel to said abscissa and beneath said rule guide, said chart guide means having an index mark spaced from said rule guide first edge by a distance equal to the spacing between said first and second elongate edges of said rule,
- said rule having along said second elongate edge a scale including two sets of graduations extending in opposite directions from a central zero fiducial mark, whereby when said first elongate edge of said rule is placed against said rule guide first edge, said rule scale is perpendicular to said abscissa and aligned with said index mark, said rule being positionable parallel to said rule guide first edge to align said central zero fiducial mark with a previously plotted mark on said chart, said rule scale thereby facilitating entry on said chart of changes in the plotted parameter.

15. Apparatus for plotting stock market data on a chart having an abscissa scale and an ordinate volume scale extending upwardly from a zero point aligned with said abscissa scale, said apparatus comprising:
- a planar, substantially rectangular base,
- a rule guide attached to said base,
- a rule having first and second elongate edges and a bottom edge perpendicular to said elongate edges,
- chart guide means attached to said base for maintaining the abscissa of said chart perpendicular to a first edge of said rule guide, said chart being positionable parallel to said abscissa and beneath said rule guide, said chart guide means having an index mark spaced from said rule guide first edge by a distance equal to the spacing between said first and second elongate edges of said rule,
- a rule having along said second elongate edge a volume scale corresponding to said ordinate volume scale and positioned so that when said rule bottom edge is placed in abutting relationship with said chart guide means, said rule volume scale will be in horizontal alignment with said chart ordinate volume scale, and when said first elongate edge of said rule is placed against said rule guide first edge, said rule second elongate edge will be parallel to said abscissa and aligned with said index mark.

* * * * *